United States Patent
Hsu et al.

(10) Patent No.: US 9,800,462 B2
(45) Date of Patent: *Oct. 24, 2017

(54) TECHNIQUES FOR INDICATING AND CHANGING NETWORK COMMUNICATION SETTINGS OF A COMPUTER HOST

(71) Applicant: INTERNATIONAL BUSINESS MACHINES CORPORATION, Armonk, NY (US)

(72) Inventors: Yun-Ting Hsu, Taipei (TW); Tsungwu Yu, Taipei (TW); Yu Yu, Shanghai (CN); Hung-Wen Huang, Taipei (TW)

(73) Assignee: International Business Machines Corporation, Armonk, NY (US)

(*) Notice: Subject to any disclaimer, the term of this patent is extended or adjusted under 35 U.S.C. 154(b) by 48 days.

This patent is subject to a terminal disclaimer.

(21) Appl. No.: 14/929,524

(22) Filed: Nov. 2, 2015

(65) Prior Publication Data

US 2016/0057007 A1 Feb. 25, 2016

Related U.S. Application Data

(63) Continuation of application No. 14/446,070, filed on Jul. 29, 2014, now Pat. No. 9,473,352.

(30) Foreign Application Priority Data

Jul. 31, 2013 (TW) .............................. 102127541 A

(51) Int. Cl.
*H04L 12/28* (2006.01)
*H04L 12/26* (2006.01)
(Continued)

(52) U.S. Cl.
CPC ..... *H04L 41/0806* (2013.01); *H01R 13/7175* (2013.01); *H04L 41/0893* (2013.01);
(Continued)

(58) Field of Classification Search
CPC .................................................. H04L 41/0806
See application file for complete search history.

(56) References Cited

U.S. PATENT DOCUMENTS

| 7,613,843 | B1 | 11/2009 | Dhandapani et al. |
| 8,190,717 | B2 | 5/2012 | Takamoto et al. |

(Continued)

FOREIGN PATENT DOCUMENTS

| CN | 102196056 A | 9/2011 |
| TW | 201216080 A | 4/2012 |
| TW | 201327144 A | 7/2013 |

OTHER PUBLICATIONS

T.Brey et. (Bladecenter chassis management, IBM J.Res & Dev vol. 49, No. 6 Nov. 2005, p. 941-961).*

(Continued)

*Primary Examiner* — Maharishi Khirodhar
(74) *Attorney, Agent, or Firm* — Brian F. Russell; Steven L. Bennett

(57) ABSTRACT

A technique for setting network communications for a computer host having multiple network interface controllers (NICs) includes performing network communication for a baseboard management controller (BMC) using a first NIC. In response to actuation of a switch of a network connector jack that is associated with the first NIC, a switching signal is sent from the switch to the BMC. In response to receipt of the switching signal at the BMC, network communication for the BMC is performed using a second NIC.

8 Claims, 5 Drawing Sheets

(51) Int. Cl.
*H04L 12/24* (2006.01)
*H01R 13/717* (2006.01)
*H04L 12/861* (2013.01)
*H01R 13/70* (2006.01)
*H01R 24/64* (2011.01)

(52) U.S. Cl.
CPC .............. *H01R 13/70* (2013.01); *H01R 24/64* (2013.01); *H04L 49/9068* (2013.01)

(56) References Cited

U.S. PATENT DOCUMENTS

| | | | | |
|---|---|---|---|---|
| 8,681,601 B1* | 3/2014 | Dalvi | .................. | G06F 11/2007 370/216 |
| 2004/0208510 A1* | 10/2004 | Ohara | .................. | H04B 10/032 398/19 |
| 2006/0280195 A1 | 12/2006 | Lopez, Jr. et al. | | |
| 2012/0151475 A1 | 6/2012 | Bealkowski | | |
| 2013/0163437 A1* | 6/2013 | Gao | .................... | G06F 11/2289 370/242 |

OTHER PUBLICATIONS

Intel, "Server Management on Intel® Server Boards and Intel® Server Platforms", Server Management Guide on Intel® Server Boards and Intel® Server Platforms—Revision 1.1, Sep. 1, 2008 URL:http://download.intel.com/support/motherboards/server/sb/server_management_rev_11.pdf.

\* cited by examiner

TECHNIQUES FOR INDICATING AND CHANGING NETWORK COMMUNICATION SETTINGS OF A COMPUTER HOST

This application is a Continuation of patent application Ser. No. 14/446,070, filed on Jul. 29, 2014, entitled "TECHNIQUES FOR INDICATING AND CHANGING NETWORK COMMUNICATION SETTING OF COMPUTER HOST", which claims priority to Taiwanese Patent Application 102127541, entitled "COMPUTER HOST AND NETWORK COMMUNICATION SETTING METHOD THEREOF," filed on Jul. 31, 2013. The disclosure is hereby incorporated herein by reference in its entirety for all purposes.

BACKGROUND

The disclosure relates to network communications and, more specifically, to techniques for indicating and changing network communication settings of a computer host.

Details about the basic structure of a baseboard management controller (BMC) of a computer host may be located in literature on IBM service processors, namely Integrated Management Module (IMM) and Integrated Management Module II (IMM2).

Conventionally, a computer host may have two different network interface controllers (NICs), namely, a general-purpose NIC for use of the computer host and a NIC dedicated to a BMC. The two NICs may have different MAC addresses and can be allocated to different IP addresses (see, for example, U.S. Patent Application Publication No. 2011/0161482).

For instance, the IBM IMM performs network communication using the general-purpose NIC of the computer host (known as a "shared mode") or using the NIC dedicated to the IMM of the computer host. For further details, refer to *Integrated Management Module User's Guides*, Third Edition, published by IBM in February 2010.

BRIEF SUMMARY

A technique for indicating and changing network communication settings for a computer host having multiple network interface controllers (NICs) includes performing network communication for a baseboard management controller (BMC) using a first NIC. In response to actuation of a switch of a network connector jack that is associated with the first NIC, a switching signal is sent from the switch to the BMC. In response to receipt of the switching signal at the BMC, network communication for the BMC is performed using a second NIC.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
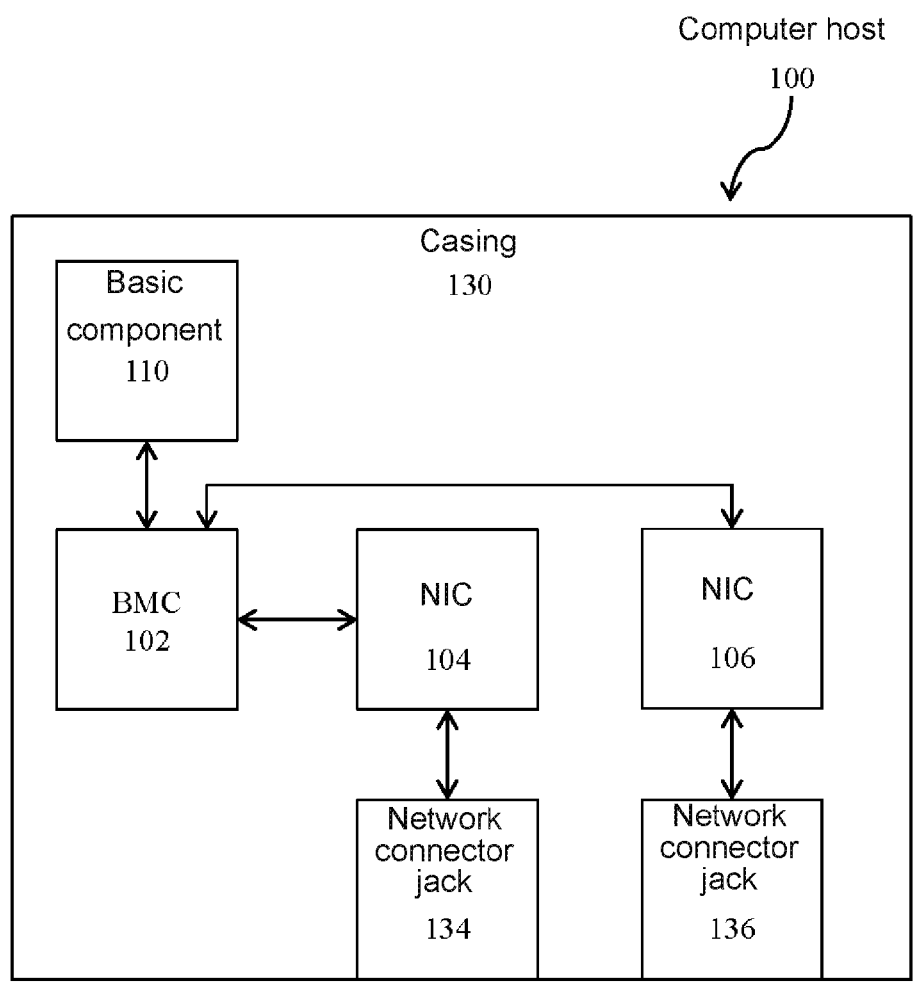
FIG. 1 is a block diagram of a computer host according to an embodiment of the present disclosure.

The illustrative embodiments provide a computer host and a method for indicating and changing network communication settings of a computer host.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be used herein, the term 'coupled' may encompass a direct connection between components or elements or an indirect connection between components or elements utilizing one or more intervening components or elements.

Conventionally in a situation where a computer host has multiple network interfaces, the computer host, particularly from the appearance, does not provide a clue to identifying the network interface in which a baseboard management controller (BMC) performs communication.

According to *Integrated Management Module User's Guides*, Third Edition, published by IBM in February 2010, as soon as the computer host boots (or restarts), inquiry or execution of the network interface for use in configuration is typically effectuated by a Unified Extensible Firmware Interface (uEFI). However, doing so may take significant time. Conventionally, a user may log into a BMC remotely in order to query or perform configuration. Before remote access begins, a user needs to know a network communication setting of the BMC and identify the network interface in which the BMC is currently performing communication.

In view of this, the present disclosure, in one aspect, provides an indicator device that is positioned at a visible external point of the computer host, such that a user can discern the network communication settings of the BMC by referring to a mode (such as color or flashing frequency) in which the indicator device is operating. According to another embodiment, a switch that is positioned at an approachable external point of the computer host is provided, such that a user can switch between the network communication settings of the BMC directly.

In an embodiment, a computer host comprises: a baseboard management controller (BMC); a first network interface controller (NIC); and a network connector jack configured to connect a network cable and the first NIC. The network connector jack may include an indicator device electrically coupled to the BMC that receives a configuration indication signal of the BMC and operates in response to the configuration indication signal.

In an embodiment, a computer host comprises: a baseboard management controller (BMC); a first network interface controller (NIC); and a network connector jack configured to connect a network cable and the first NIC. The network connector jack may include a switch electrically coupled to the BMC. A user may send a switching signal to the BMC through the switch. In this case, the BMC changes its network communication setting in response to the switching signal.

In another embodiment, a method of changing a network communication setting of a BMC of a computer host using a switch of a network connector jack of the computer host is disclosed.

Figure 2A:
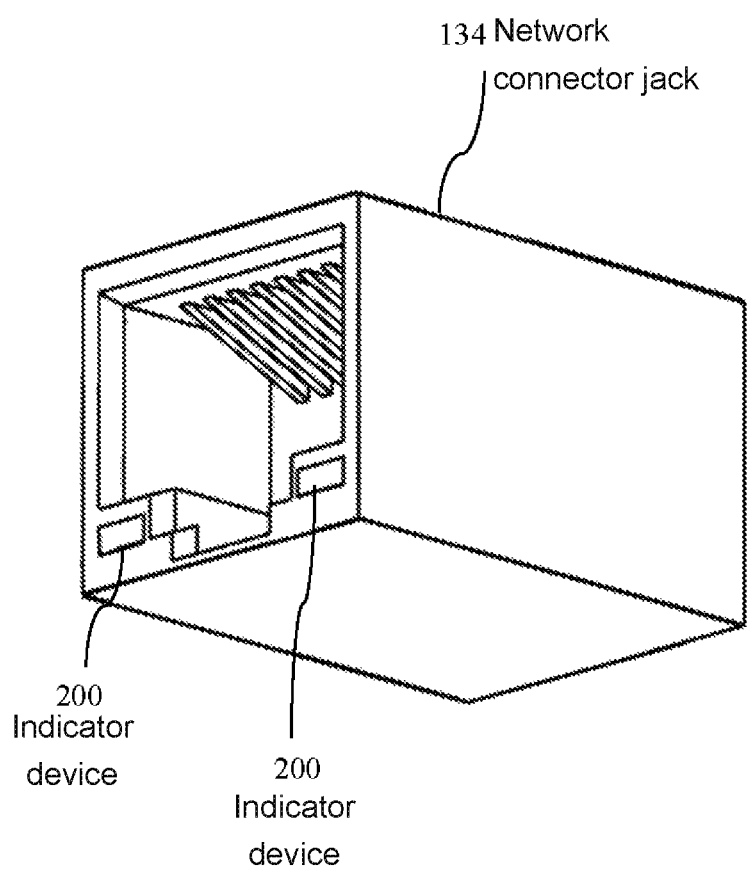
FIGS. 2A-2C are schematic views of network connector jacks according to embodiments of the present disclosure.
Figure 2B:
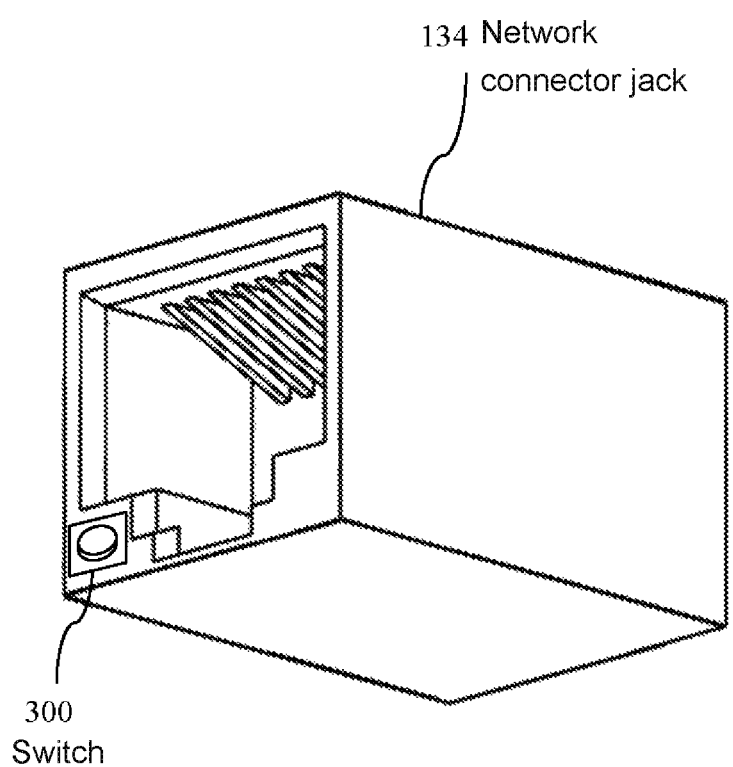
Figure 2C:
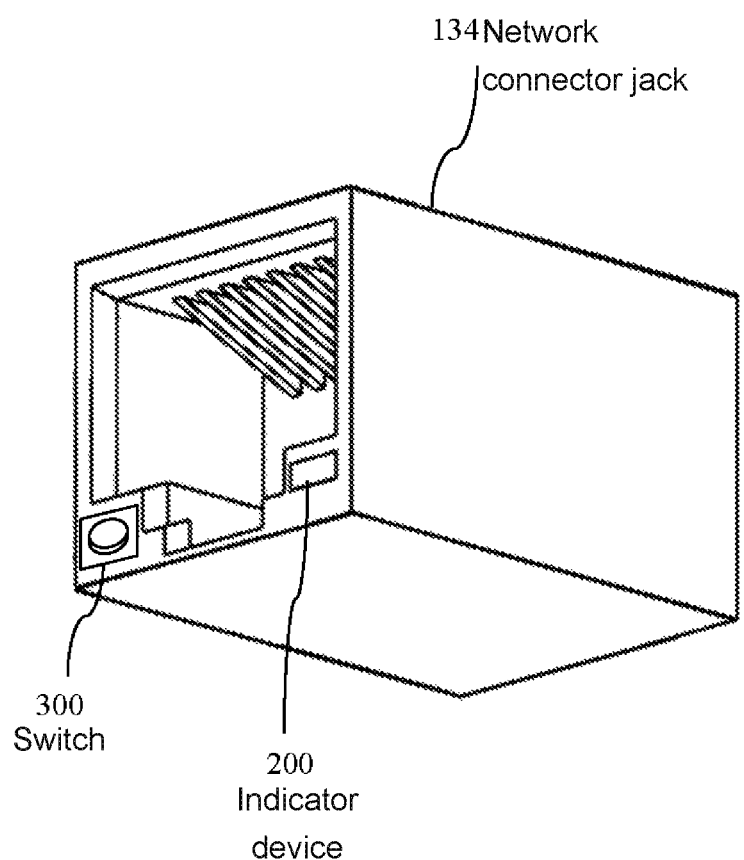
Figure 3:
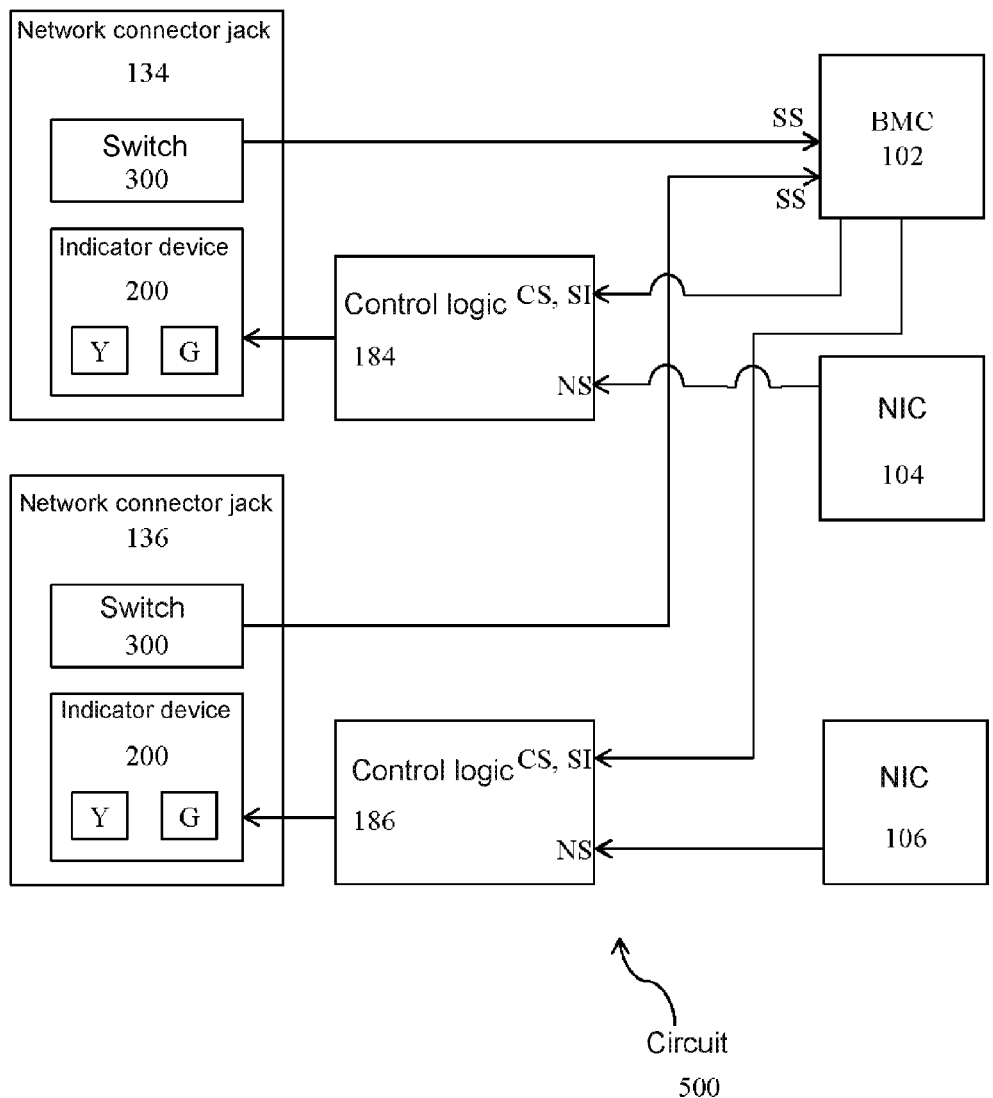
FIG. 3 is a schematic view of a circuit associated with the embodiment illustrated in FIG. 2C.

Referring now to FIG. 1 through FIG. 3, systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates the hardware framework of a computer host 100, according to an embodiment of the present invention. The computer host 100 comprises a casing 130. The casing 130 contains therein a baseboard management controller (BMC) 102, two separate network interface controllers (NICs) 104 and 106, and a basic component 110 (such as a central processing unit, a main memory module, or a hard disk drive, etc.). In particular, the BMC 102 has different network communication settings and performs network communication through one of the NICs 104 and 106, for example. In one embodiment, the NIC 104 is dedicated to the BMC 102 and the NIC 106 is available to the other devices, such as a central processing unit (not shown), of the computer host 100 (and, as such, the NIC 106 is not dedicated to the BMC 102).

For the basic framework attributed to the computer host 100 but not directly related to the present invention, refer to conventional personal computers or servers, such as IBM System X, Blade Center, or eServer and, more specifically, to IBM System x 3550 M4. Details not related to the present invention are left out in the following description. Referring to FIG. 1, the casing 130 has a network connector jack 134 (allocated to the NIC 104) and a network connector jack 136 (allocated to the NIC 106). In the embodiment described below, the NICs 104 and 106 are provided in the form of Ethernet NICs.

The network connector jacks 134 and 136 may each be coupled to an external RJ-45 network cable. For the basic structure attributed to the network connector jacks 134 and 136, but not directly related to the present invention, refer to conventional RJ-45 connector jacks or U.S. Patent Application Publication No. 2011/0267191, for example. If the NICs 104 and 106 are not provided in the form of Ethernet NICs, the structure of the network connector jacks 134 and 136 may change to comply with a protocol supported by the NICs 104 and 106. Moreover, while the various embodiments are exemplified by the network connector jacks 134 and 136, more than two network connector jacks may be employed according to the present disclosure.

Various embodiments of the network connector jacks of the present disclosure are illustrated in FIG. 2A through FIG. 2C and further described below. Although the description below is exemplified by the network connector jack 134, the description below also applies to the network connector jack 136. Referring to FIG. 2A, the network connector jack 134 has an indicator device 200. The indicator device 200 may be a light-emitting diode (LED) device, but is not restricted thereto. Moreover, the disclosed quantity and position of the indicator device 200 on the network connector jack 134 are illustrative rather than restrictive. In at least one embodiment, the network connector jack 134 has two of the indicator devices 200 disposed at two corners on the front of the network connector jack 134, respectively, as shown in FIG. 2A. Further details of the operation of the indicator device 200 are set forth in Table 1 and discussed with respect to FIG. 3.

Referring to FIG. 2B, the network connector jack 134 includes a switch 300. As shown in FIG. 2B, the switch 300 is exemplified by a press switch (i.e., a pushbutton switch), but the switch 300 is not so limited. For example, the switch 300 can be a toggle switch. The disclosed position of the switch 300 on the network connector jack 134 is illustrative, rather than restrictive, and the switch 300 can be positioned anywhere on the network jack connector 124 (provided that the switch 300 is accessible to users). The number of statuses between which the switch 300 is switched is subject to change, provided that it meets the switching requirements of the BMC 102. Further details of the operation of the switch 300 are set forth in Table 1 and discussed with respect to FIG. 3.

Referring to FIG. 2C, the network connector jack 134 includes the indicator device 200 and the switch 300 according to an embodiment of the present disclosure. While the related circuit connection and operation of the network connector jack 134 is illustrated in FIG. 2C and described below, it should be noted that the present disclosure further includes a variant pertaining to the network connector jack 134 that is equipped solely with the indicator device 200 (as shown in FIG. 2A) and another variant pertaining to the network connector jack 134 that is equipped solely with the switch 300 (as shown in FIG. 2B). Furthermore, in an embodiment not shown, the indicator device 200 and the switch 300 are integrally coupled together to form a unitary structure. That is, in at least one embodiment, the indicator device 200 is directly mounted on the switch 300, such that a size of the network connector jack 134 can be reduced.

FIG. 3 shows a circuit 500 between the BMC 102, the NICs 104 and 106, and the network connector jacks 134 and 136 according to an embodiment. In particular, in the embodiment of FIG. 3, the circuit 500 further comprises a control logic 184 (corresponding in function to the network connector jack 134) and a control logic 186 (corresponding in function to the network connector jack 136). The control logic 184 and the control logic 186 may take the form of programmable integrated circuits (programmable ICs), field programmable gate arrays (FPGAs), or any other circuits meeting the aforesaid logical requirement. The NIC 104 (106) has a signal pin (not shown) for sending a connection status indication signal 'NS' to the control logic 184 (186). For further details about connection status indication signal 'NS', refer to U.S. Patent Application Publication No. 2011/0267191 and commercially-available network card products, such as TP-LINK. TG-3269 Gigabit PCI network card.

When the connection status indication signal 'NS' is at a high voltage level, the NIC 104 (106) has detected an abnormal connection status or a connection failure. Conversely, when the connection status indication signal 'NS' is at a low voltage level, the NIC 104 (106) has detected a normal connection status. The BMC 102 is electrically connected to other components on the circuit 500 via multiple general-purpose input/output (GPIO) so as to send/receive signals. In an embodiment, the BMC 102 receives switching signal 'SS' from the switch 300 and sends a configuration indication signal 'CS' and a switching indication signal 'SI' to the control logic 184 (186). In this embodiment, when the configuration indication signal 'CS' (sent to the control logic 184) is at a high voltage level, the BMC 102 is not using the NIC 104 (106) connected to the control logic 184 (186) for network communication. Conversely, when the configuration indication signal 'CS' is at a low voltage level, the BMC 102 is performing network communication using the NIC 104 (106) connected to control logic 184 (186).

When the switching indication 'SI' signal (sent to the control logic 184 (186)) is at a low voltage level, the BMC 102 is currently changing its network communication setting (for example, switching between the NICs 104 and 106). Upon completion of the switching process or when the BMC 102 has not changed its network communication setting, the switching indication signal 'SI is at or returns to a high voltage level. Therefore, regarding the network connector jack 134 allocated to the NIC 104, the control logic 184 controls the operation of the indicator device 200 of the network connector jack 134 according to the configuration indication signal 'CS' and the switching indication signal 'SI' (from the BMC 102) and the connection status indication signal 'NS' (from the NIC 104) in a manner to allow a user to visually discern the five statuses enumerated in Table 1 below. It should be appreciated that the present disclosure is not limited to displaying the statuses of Table 1. In one or more embodiments, the indicator device 200 includes a yellow LED unit 'Y' and a green LED unit 'G' that emit yellow light and green light, respectively. Similarly, the control logic 186 controls the operation of the indicator device 200 of the network connector jack 136 according to the configuration indication signal 'CS' and the switching indication signal 'SI' (from the BMC 102) and the connection status indication signal 'NS' (from the NIC 106).

TABLE 1

| Status No. | Signal CS | Signal SI | Signal NS | LED Lamp |
| --- | --- | --- | --- | --- |
| 1 | high voltage level | high voltage level | high voltage level | Off |
| 2 | high voltage level | high voltage level | Low voltage level | Green |
| 3 | low voltage level | high voltage level | high voltage level | Off |
| 4 | low voltage level | high voltage level | Low voltage level | Yellow |
| 5 | Not considered | low | not considered | Flashing |

The five operation statuses illustrated in Table 1 are further described below with respect to NIC 104. In Status No. 1, the BMC 102 is not using the NIC 104 (connected to the control logic 184) to perform network communication, as the configuration indication signal 'CS' is at a high voltage level. Additionally, the BMC 102 is not changing its network communication setting, as the switching indication signal 'SI' is at a high voltage level. Furthermore, the NIC 104 has detected an abnormal connection status or a connection failure, as the connection status indication signal 'NS' is at a high voltage level. In this case, the control logic 184 turns off the indicator device 200 of the network connection jack 134. That is, the indicator device 200 does not emit any light.

In Status No. 2, the BMC 102 is not using the NIC 104 (connected to the control logic 184) to perform network communication, as the configuration indication signal 'CS' is at a high voltage level. Additionally, the BMC 102 is not changing its network communication setting, as the switching indication signal 'SI' is at a high voltage level. Furthermore, the NIC 104 has detected a normal connection status, as the connection status indication signal 'NS' is at a low voltage level. In this case, the control logic 184 drives green LED unit 'G' of the indicator device 200 to emit green light.

In Status No. 3, the BMC 102 is using the NIC 104 (connected to the control logic 184) to perform network communication, as the configuration indication signal 'CS' is at a low voltage level. Additionally, the BMC 102 is not changing its network communication setting, as switching indication signal 'SI' is at a high voltage level. Furthermore, the NIC 104 has detected an abnormal connection status or a connection failure, as the connection status indication signal 'NS' is at a high voltage level. In this case, the control logic 184 turns off the indicator device 200. That is, the indicator device 200 does not emit any light. Hence, like Status No. 1, Status No. 3 is characterized in that the indicator device 200 does not emit any light, provided that the NIC 104 detects an abnormal connection status or a connection failure, so as to instruct the user to handle the connection status abnormality first.

In Status No. 4, the BMC 102 is using the NIC 104 (connected to the control logic 184) to perform network communication, as the configuration indication signal 'CS' is at a low voltage level. Additionally, the BMC 102 is not changing its network communication setting, as the switching indication signal 'SI' is at a high voltage level. Furthermore, the NIC 104 has detected a normal connection status, as the connection status indication signal 'NS' is at a low voltage level. In this case, the control logic 184 drives the yellow LED unit 'Y' of the indicator device 200 to emit yellow light.

In Status No. 5, the BMC 102 is changing its network communication setting (for example, switching from the NIC 104 to the NIC 106, or switching back from the NIC 106 to the NIC 104) in response to switching signal 'SS' sent by the user via the switch 300, as the switching indication signal 'SI' is at a low voltage level. In this case, the control logic 184 controllably drives green LED unit 'G' in the indicator device 200 to emit green light intermittently in response to switching indication signal 'SI' of a low voltage level. Upon receipt of switching indication signal 'SI' of a low voltage level, the control logic 184 does not consider configuration indication signal 'CS' and connection status indication signal 'NS'. In the situation where connection status of the NIC 104 remains normal (i.e., ruling out Status No. 1 and Status No. 3), Status No. 2 (in which the BMC 102 performs network communication without using the MC 104 connected to the control logic 184) is replaced by Status No. 4 (in which the BMC 102 performs network communication by the NIC 104 connected to the control logic 184) after the BMC 102 has finished changing its network communication setting and Status No. 4 is replaced by Status No. 2 after the BMC 102 has finished changing its network communication setting.

According, techniques have been disclosed herein that facilitate indicating and changing network communication settings of a computer host.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for setting network communications for a computer host having multiple network interface controllers (NICs), comprising:
   performing network communication for a baseboard management controller (BMC) using a first NIC;
   in response to actuation of a first switch of a first network connector jack that is associated with the first NIC, sending a first switching signal from the first switch to the BMC;
   in response to receipt of the first switching signal at the BMC, performing network communication for the BMC using a second NIC;
   in response to actuation of a second switch of a second network connector jack that is associated with the second NIC, sending a second switching signal from the second switch to the BMC; and
   in response to receipt of the second switching signal at the BMC, performing network communication for the BMC using the first NIC.

2. The method of claim 1, wherein the first network connector jack includes a first indicator device coupled to the BMC and the method further comprises:
   sending a configuration indication signal from the BMC to the first indicator device, wherein the configuration indication signal, when received at the first indicator device, causes the first indicator device to display a mode of operation to indicate that the first NW is being used by the BMC or the first NIC is not being used by the BMC.

3. The method of claim 1, wherein the first NIC is dedicated to the BMC and the second NIC is not dedicated to the BMC.

4. The method of claim 1, wherein the first switch is a pushbutton switch.

5. The method of claim 2, wherein the first indicator device is coupled to the first NIC and the mode is also determined by a connection status indication signal provided by the first NIC.

6. The method of claim 2, wherein the first indicator device provides a first color light in response to the configuration indication signal being in a first state and a second color light, different from the first color light, in response to the configuration indication signal being in a second state, different from the first state, when the first NIC is connected.

7. The method of claim 2, wherein the first indicator device provides no light in response to the configuration indication signal being in a first state or a second state, different from the first state, when the first NIC is not connected.

8. The method of claim 2, wherein the first indicator device provides a flashing light in response to a switching indication signal provided by the BMC to the first network connector jack being in a given state, and wherein the BMC is configured to provide the switching indication signal in the given state in response to receipt of the first switching signal from the first network connector jack.

* * * * *